US012127115B2

(12) United States Patent
Byun et al.

(10) Patent No.: US 12,127,115 B2
(45) Date of Patent: Oct. 22, 2024

(54) METHOD AND APPARATUS FOR SAVING ENERGY FOR A DISTRIBUTED UNIT IN A WIRELESS COMMUNICATION SYSTEM

(71) Applicant: LG ELECTRONICS INC., Seoul (KR)

(72) Inventors: Daewook Byun, Seoul (KR); Jian Xu, Seoul (KR); Seokjung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 377 days.

(21) Appl. No.: 17/620,479

(22) PCT Filed: Jul. 1, 2020

(86) PCT No.: PCT/KR2020/008576
§ 371 (c)(1),
(2) Date: Dec. 17, 2021

(87) PCT Pub. No.: WO2021/002667
PCT Pub. Date: Jan. 7, 2021

(65) Prior Publication Data
US 2022/0264447 A1 Aug. 18, 2022

(30) Foreign Application Priority Data
Jul. 1, 2019 (KR) .................. 10-2019-0079031

(51) Int. Cl.
*H04W 52/02* (2009.01)
*H04W 48/18* (2009.01)
(Continued)

(52) U.S. Cl.
CPC ....... *H04W 52/0206* (2013.01); *H04W 48/18* (2013.01); *H04W 88/14* (2013.01)

(58) Field of Classification Search
CPC . H04W 52/0206; H04W 48/18; H04W 88/14; H04W 88/085; H04W 52/0235; Y02D 30/70
(Continued)

(56) References Cited

U.S. PATENT DOCUMENTS

2014/0135030 A1 5/2014 Wang et al.
2014/0369259 A1* 12/2014 Lee ..................... H04L 65/612
370/328
(Continued)

FOREIGN PATENT DOCUMENTS

KR 10-2014-0109143 9/2014

OTHER PUBLICATIONS

Section 6 of 3GPP TR 38.874 V16.0.0.
(Continued)

*Primary Examiner* — Inder P Mehra
(74) *Attorney, Agent, or Firm* — BRYAN CAVE LEIGHTON PAISNER LLP

(57) ABSTRACT

A method and apparatus for saving energy for a Distributed Unit in a wireless communication system is provided. A CU establishes a connection between a Distributed Unit (DU). The CU receives, from the DU, a first message including deactivation request for the DU. The CU determines whether to permit deactivation of the DU or not. The CU transmits, to the DU, a second message in response to the first message, wherein the second message includes information informing that the deactivation request for the DU is accepted or not based on the determination.

8 Claims, 17 Drawing Sheets

(51) Int. Cl.
*H04W 88/02* (2009.01)
*H04W 88/14* (2009.01)

(58) Field of Classification Search
USPC .......................................... 370/318
See application file for complete search history.

(56) References Cited

U.S. PATENT DOCUMENTS

| | | | |
|---|---|---|---|
| 2017/0163342 A1* | 6/2017 | Testa | H04Q 11/0003 |
| 2019/0098529 A1* | 3/2019 | Park | H04W 28/0231 |
| 2019/0342809 A1* | 11/2019 | Kim | H04L 5/0048 |
| 2021/0227606 A1* | 7/2021 | Liu | H04W 28/06 |
| 2021/0345322 A1* | 11/2021 | Tiirola | H04W 72/1263 |
| 2021/0377784 A1* | 12/2021 | Marco | H04L 47/10 |

OTHER PUBLICATIONS

Huawei et al., "The Cell Management via W1 interface," R3-192668, 3GPP TSG-RAN WG3 Meeting #104, Reno, Nevada, May 3, 2019, section 2.
Ericsson, "IAB General Aspects," R3-191354, 3GPP TSG RAN WG3 Meeting #103bis, Xian, P.R. China, Mar. 29, 2019, sections 5.2.1-5.2.3.
CMCC, "Cell deactivation and reactivation via F1 interface for energy saving," R3-173906, 3GPP TSG RAN WG3 #97bis, Prague, Czech Republic, Sep. 29, 2017, section 2; and figure 1.

* cited by examiner

METHOD AND APPARATUS FOR SAVING ENERGY FOR A DISTRIBUTED UNIT IN A WIRELESS COMMUNICATION SYSTEM

This application is the National Stage filing under 35 U.S.C. 371 of International Application No. PCT/KR2020/008576 filed on Jul. 1, 2020, which claims priority to Korean Patent Application No. 10-2019-0079031 filed on Jul. 1, 2019, the contents of which are all hereby incorporated by reference herein in their entirety.

TECHNICAL FIELD

The present disclosure relates to a method and apparatus for saving energy for a Distributed Unit in a wireless communication system.

RELATED ART

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

One of the potential technologies targeted to enable future cellular network deployment scenarios and applications is the support for wireless backhaul and relay links enabling flexible and very dense deployment of NR cells without the need for densifying the transport network proportionately.

Due to the expected larger bandwidth available for NR compared to LTE (e.g. mmWave spectrum) along with the native deployment of massive multiple-input multiple-output (MIMO) or multi-beam systems in NR creates an opportunity to develop and deploy integrated access and backhaul (IAB) links. This may allow easier deployment of a dense network of self-backhauled NR cells in a more integrated manner by building upon many of the control and data channels/procedures defined for providing access to user equipments (UEs). Due to deployment of IAB links, relay nodes (relay transmission/reception points (rTRPs)) can multiplex access and backhaul links in time, frequency, or space (e.g. beam-based operation).

SUMMARY

IAB-node may host two NR functions: (i) a Mobile Termination (MT), used to maintain the wireless backhaul connection towards an upstream IAB-node or IAB-donor, (ii) a Distributed Unit (DU), to provide access connection to the UEs or the downstream MTs of other IAB-nodes. The DU of the IAB-node may connect to a Central Unit (CU) hosted by the IAB-donor.

An IAB-donor and an IAB-node of IAB network may have the relation of a gNB Central Unit (gNB-CU) and a gNB Distributed Unit (gNB-DU) defined in 5G NR.

The IAB-nodes deployed in urban area may not provide the service during the certain time (for example, midnight) because there is no UE within their coverage areas or there is no data to be transmitted/received to/from their child IAB-node(s). During this time, they are unnecessary to be operated as IAB-node considering energy efficiency.

Therefore, the studies for energy efficient operation of a Distributed Unit (for example, an IAB-node or a gNB-DU) is needed.

In an aspect, a method performed by a Central Unit (CU) in a wireless communication system is provided. The CU establishes a connection between a Distributed Unit (DU). The CU receives, from the DU, a first message including deactivation request for the DU. The CU determines whether to permit deactivation of the DU or not. The CU transmits, to the DU, a second message in response to the first message, wherein the second message includes information informing that the deactivation request for the DU is accepted or not based on the determination.

In another aspect, a non-transitory computer-readable medium having stored thereon a plurality of instructions, which, when executed by a processor of a Central Unit (CU) is provided. The plurality of instructions cause the CU to establish a connection between a Distributed Unit (DU). The plurality of instructions cause the CU to receive, from the DU, a first message including deactivation request for the DU. The plurality of instructions cause the CU to determine whether to permit deactivation of the DU or not. The plurality of instructions cause the CU to transmit, to the DU, a second message in response to the first message, wherein the second message includes that the deactivation request for the DU is accepted or not based on the determination.

The present disclosure may have various advantageous effects.

According to some embodiments of the present disclosure, energy efficient operation of a Distributed Unit in a wireless communication system will be provided.

For example, a gNB-DU could enter into energy saving mode depending of permission of a gNB-CU.

For example, adjacent gNB-DU(s) connected to the gNB-CU could know that the gNB-DU enters to the energy saving mode.

Thus, the power of the gNB could be used efficiently. In addition, the degradation of UE's experience by energy saving of a gNB-DU could be avoided.

For example, an IAB-node could enter into energy saving mode depending on permission of IAB-donor based on IAB network situation.

For example, adjacent IAB-node(s) having backhaul RLC channel with the IAB-node could know that the IAB-node enters to the energy saving mode.

Thus, the power of IAB network could be used efficiently. In addition, the degradation of UE's experience by energy saving of the IAB-node could be avoided.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DESCRIPTION

Figure 1:
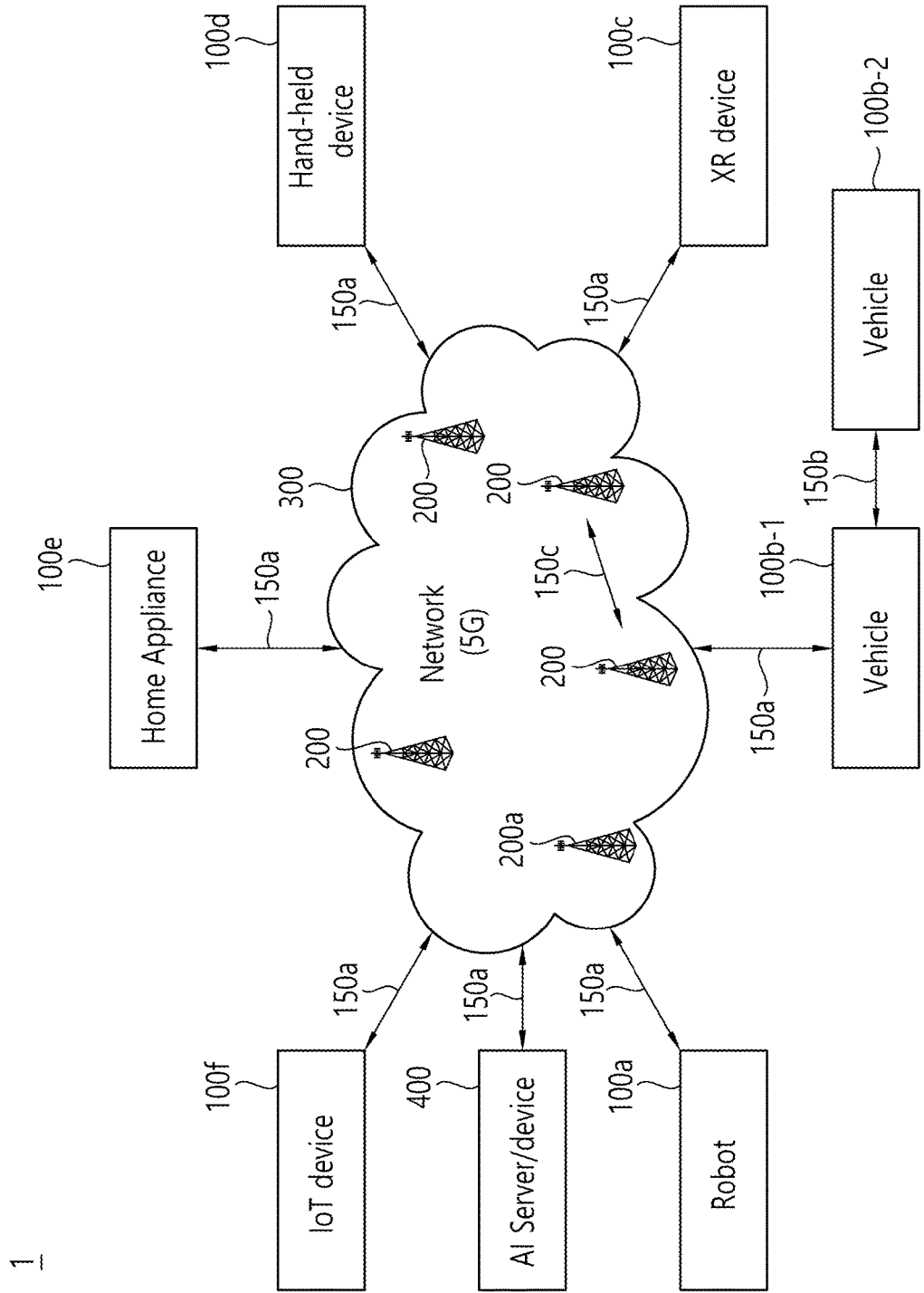
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructable wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

Figure 2:
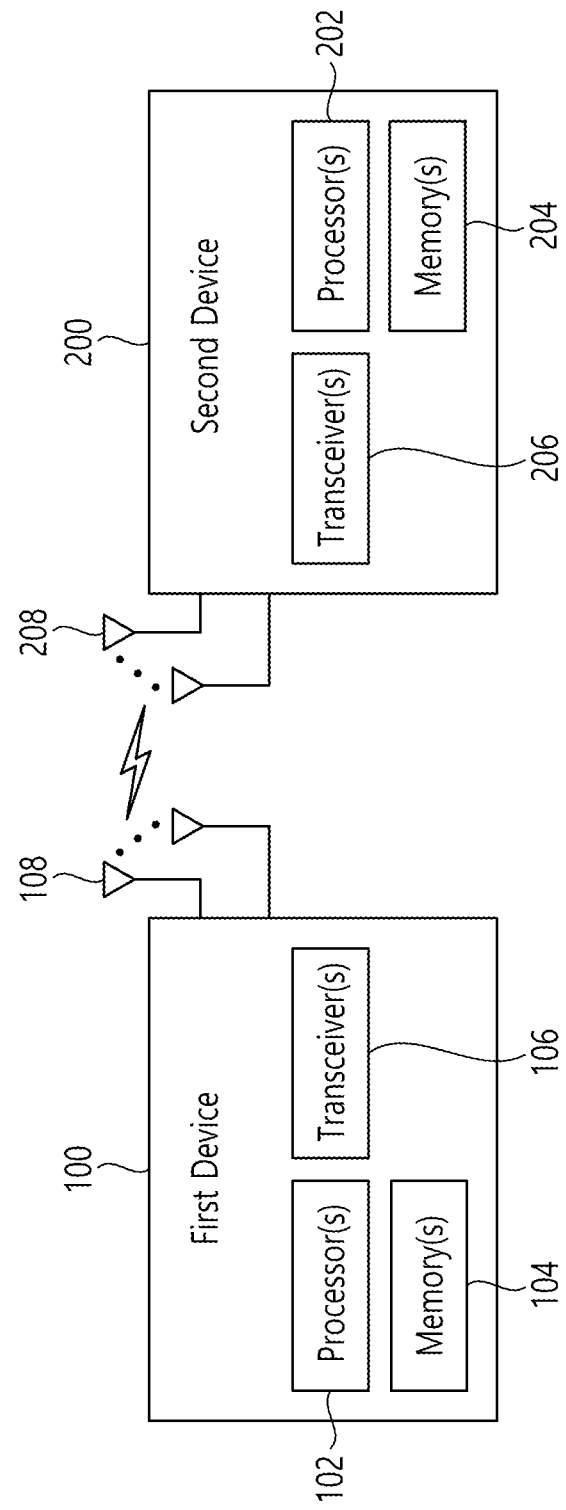
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR). In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, suggestions, methods and/or operational flowcharts described in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, suggestions, methods and/or operational flowcharts described in the present disclosure. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present disclosure, the first wireless device 100 may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, suggestions, methods and/or operational flowcharts described in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, suggestions, methods and/or operational flowcharts described in the present disclosure. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
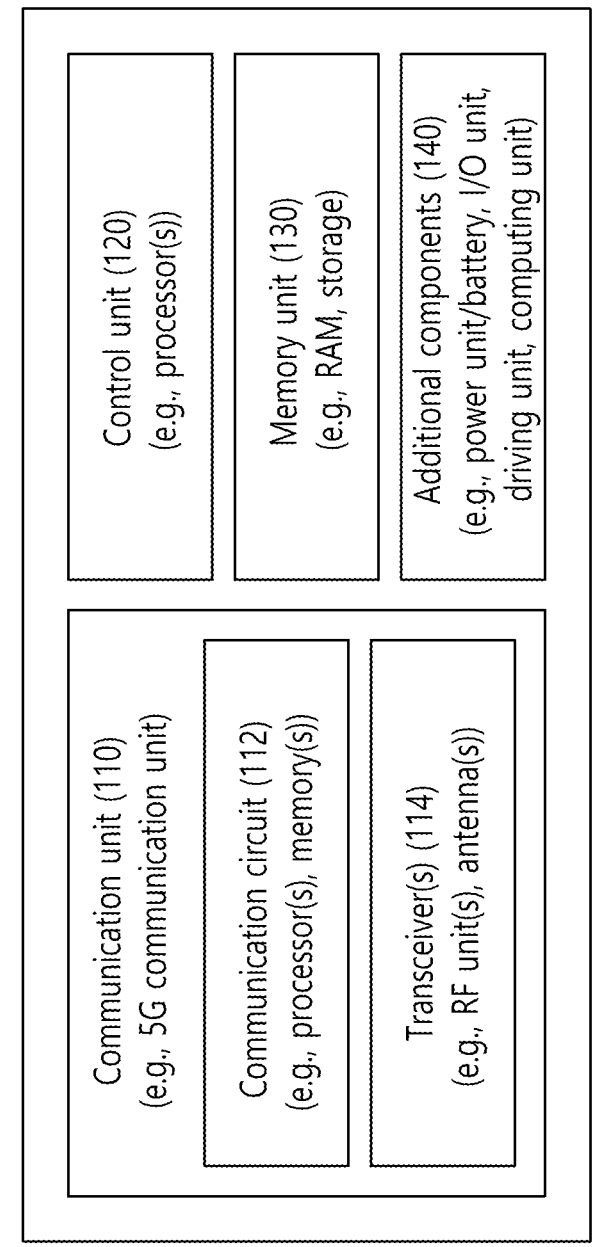
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 4:
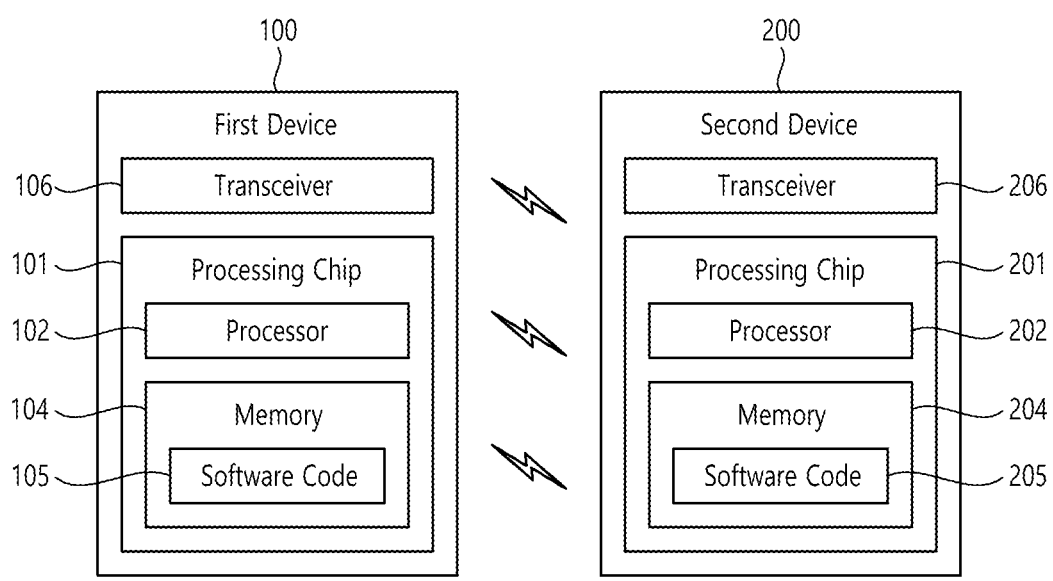
FIG. 4 shows another example of wireless devices to which implementations of the present disclosure is applied.

FIG. 4 shows another example of wireless devices to which implementations of the present disclosure is applied.

Referring to FIG. 4, wireless devices 100 and 200 may correspond to the wireless devices 100 and 200 of FIG. 2 and may be configured by various elements, components, units/portions, and/or modules.

The first wireless device 100 may include at least one transceiver, such as a transceiver 106, and at least one processing chip, such as a processing chip 101. The processing chip 101 may include at least one processor, such a processor 102, and at least one memory, such as a memory 104. The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 may perform one or more layers of the radio interface protocol.

The second wireless device 200 may include at least one transceiver, such as a transceiver 206, and at least one processing chip, such as a processing chip 201. The processing chip 201 may include at least one processor, such a processor 202, and at least one memory, such as a memory 204. The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 may perform one or more layers of the radio interface protocol.

Figure 5:
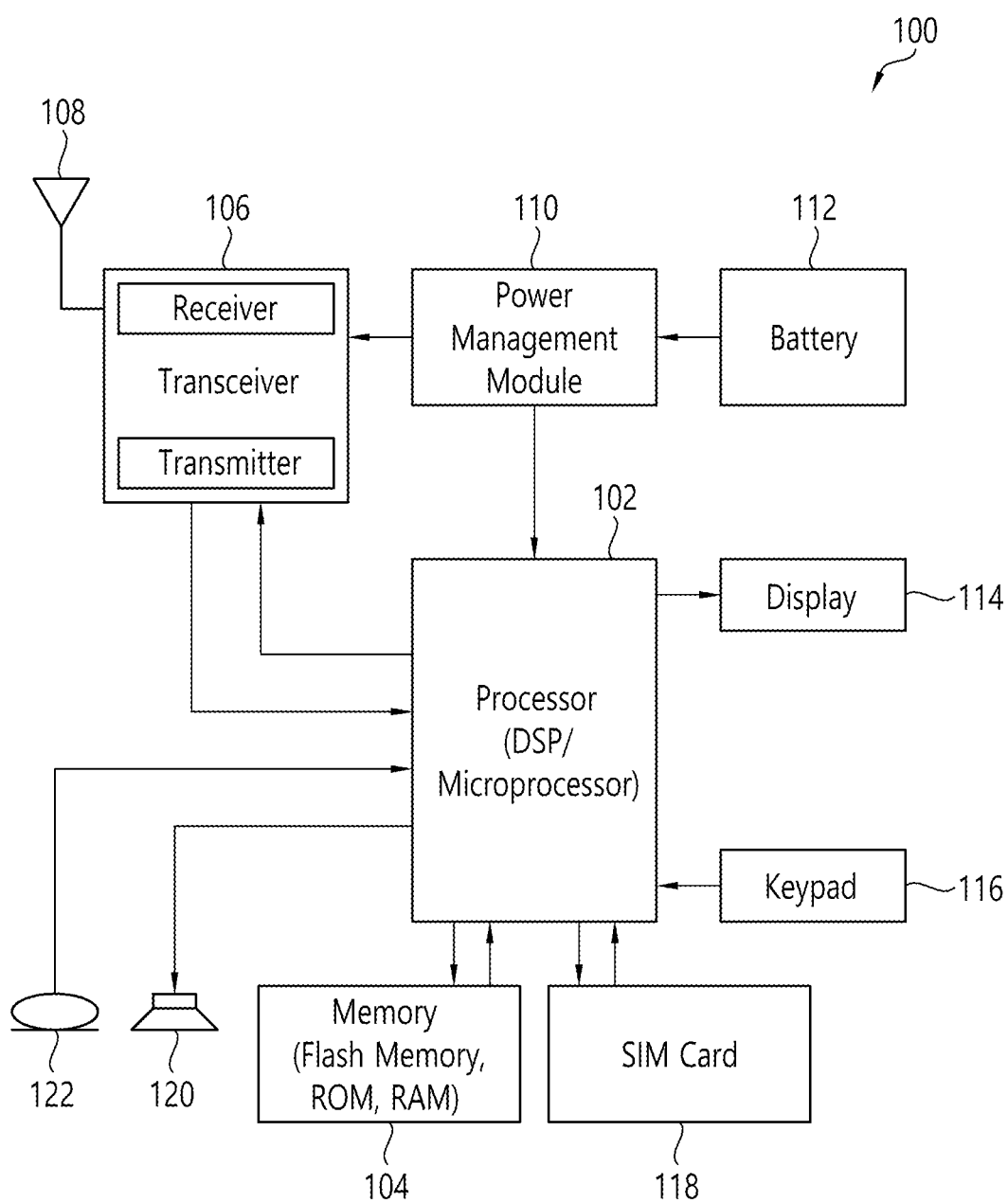
FIG. 5 shows an example of UE to which implementations of the present disclosure is applied.

FIG. 5 shows an example of UE to which implementations of the present disclosure is applied.

Referring to FIG. 5, a UE 100 may correspond to the first wireless device 100 of FIG. 2 and/or the first wireless device 100 of FIG. 4.

A UE 100 includes a processor 102, a memory 104, a transceiver 106, one or more antennas 108, a power management module 110, a battery 1112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Hereinafter, an apparatus for saving energy for a Distributed Unit in a wireless communication system, according to some embodiments of the present disclosure, will be described.

Referring to FIG. 5, a wireless device 100 may be a Central Unit (CU) in a wireless communication system. The CU may include a processor 102, a memory 104, and a transceiver 106.

According to some embodiments of the present disclosure, the processor 102 may be configured to be coupled operably with the memory 104 and the transceiver 106.

The processor 102 may be configured to establish a connection between a Distributed Unit (DU). The processor 102 may be configured to receive, from the DU, a first message including deactivation request for the DU. The processor 102 may be configured to determine whether to permit deactivation of the DU or not. The processor 102 may be configured to transmit, to the DU, a second message in response to the first message, wherein the second message includes that the deactivation request for the DU is accepted or not based on the determination.

Hereinafter, a processor for a Central Unit (CU) for saving energy for a Distributed Unit in a wireless communication system, according to some embodiments of the present disclosure, will be described.

The processor may be configured to control the CU to establish a connection between a Distributed Unit (DU). The processor may be configured to control the CU to receive, from the DU, a first message including deactivation request for the DU. The processor may be configured to control the CU to determine whether to permit deactivation of the DU or not. The processor may be configured to control the CU to transmit, to the DU, a second message in response to the first message, wherein the second message includes that the deactivation request for the DU is accepted or not based on the determination.

Hereinafter, a non-transitory computer-readable medium has stored thereon a plurality of instructions for saving energy for a Distributed Unit in a wireless communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a Central Unit (CU).

The stored a plurality of instructions may cause the CU to establish a connection between a Distributed Unit (DU). The stored a plurality of instructions may cause the CU to receive, from the DU, a first message including deactivation request for the DU. The stored a plurality of instructions may cause the CU to determine whether to permit deactivation of the DU or not. The stored a plurality of instructions may cause the CU to transmit, to the DU, a second message in response to the first message, wherein the second message includes that the deactivation request for the DU is accepted or not based on the determination.

Figure 6:
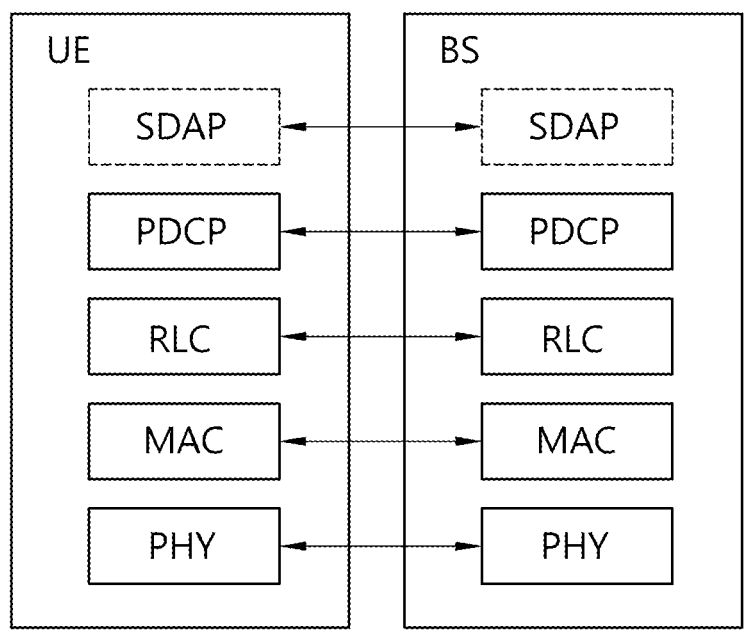
FIGS. 6 and 7 show an example of protocol stacks in a 3GPP based wireless communication system to which implementations of the present disclosure is applied.
Figure 7:
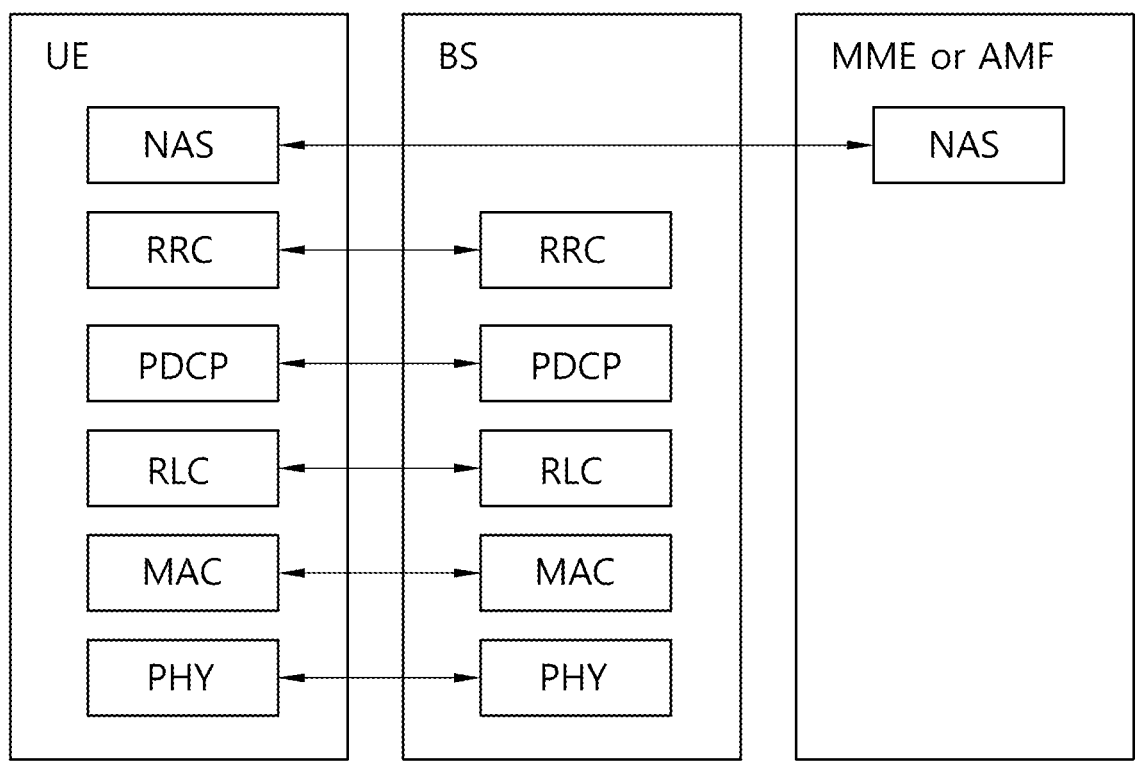

FIGS. 6 and 7 show an example of protocol stacks in a 3GPP based wireless communication system to which implementations of the present disclosure is applied.

In particular, FIG. 6 illustrates an example of a radio interface user plane protocol stack between a UE and a BS and FIG. 7 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 6, the user plane protocol stack may be divided into Layer 1 (i.e., a PHY layer) and Layer 2. Referring to FIG. 7, the control plane protocol stack may be divided into Layer 1 (i.e., a PHY layer), Layer 2, Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QoS) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH); BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using robust header compression (ROHM); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer, UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Figure 8:
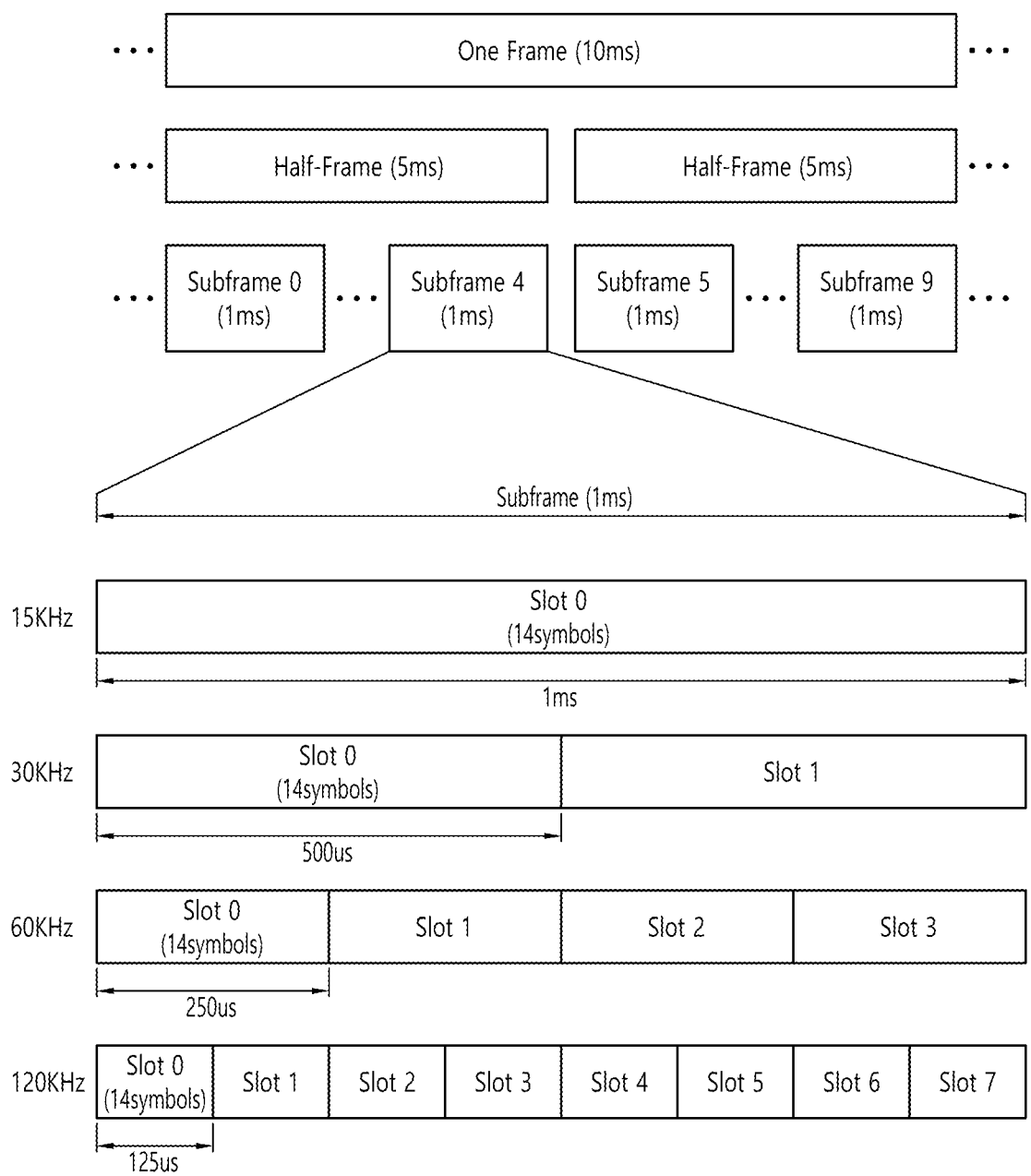
FIG. 8 shows a frame structure in a 3GPP based wireless communication system to which implementations of the present disclosure is applied.

FIG. 8 shows a frame structure in a 3GPP based wireless communication system to which implementations of the present disclosure is applied.

The frame structure shown in FIG. 8 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 8, downlink and uplink transmissions are organized into frames. Each frame has $T_f=10$ ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f=2^u*15$ kHz.

Table 1 shows the number of OFDM symbols per slot $N^{slot}_{symb}$, the number of slots per frame $N^{frame,u}_{slot}$, and the number of slots per subframe $N^{subframe,u}_{slot}$ for the normal CP, according to the subcarrier spacing $\Delta f=2^u*15$ kHz.

TABLE 1

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 2 shows the number of OFDM symbols per slot $N^{slot}_{symb}$, the number of slots per frame $N^{frame,u}_{slot}$, and the number of slots per subframe $N^{subframe,u}_{slot}$ for the extended CP, according to the subcarrier spacing $\Delta f=2^u*15$ kHz.

TABLE 2

| u | $N^{slot}_{symb}$ | $N^{frame,u}_{slot}$ | $N^{subframe,u}_{slot}$ |
|---|---|---|---|
| 2 | 12 | 40 | 4 |

A slot includes plural symbols (e.g., 14 or 12 symbols) in the time domain. For each numerology (e.g., subcarrier spacing) and carrier, a resource grid of $N^{size,u}_{grid,x} * N^{RB}_{sc}$ subcarriers and $N^{subframe,u}_{symb}$ OFDM symbols is defined, starting at common resource block (CRB) $N^{start,u}_{grid}$ indicated by higher-layer signaling (e.g., RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ for subcarrier spacing configuration u is given by the higher-layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain. In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N^{size}_{BWP,i}-1$, where i is the number of the bandwidth part. The relation between the physical resource block $n_{PRB}$ in the bandwidth part i and the common resource block $n_{CRB}$ is as follows: $n_{PRB}=n_{CRB}+N^{size}_{BWP,i}$, where $N^{size}_{BWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

The NR frequency band may be defined as two types of frequency range, i.e., FR1 and FR2. The numerical value of the frequency range may be changed. For example, the frequency ranges of the two types (FR1 and FR2) may be as shown in Table 3 below. For ease of explanation, in the frequency ranges used in the NR system, FR1 may mean "sub 6 GHz range", FR2 may mean "above 6 GHz range," and may be referred to as millimeter wave (mmW).

TABLE 3

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 4 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 4

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

In the present disclosure, the term "cell" may refer to a geographic area to which one or more nodes provide a communication system, or refer to radio resources. A "cell" as a geographic area may be understood as coverage within which a node can provide service using a carrier and a "cell" as radio resources (e.g., time-frequency resources) is associated with bandwidth which is a frequency range configured by the carrier. The "cell" associated with the radio resources is defined by a combination of downlink resources and uplink resources, for example, a combination of a DL component carrier (CC) and a UL CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node.

Accordingly, the term "cell" may be used to represent service coverage of the node sometimes, radio resources at other times, or a range that signals using the radio resources can reach with valid strength at other times. In CA, two or more CCs are aggregated. A UE may simultaneously receive or transmit on one or multiple CCs depending on its capabilities. CA is supported for both contiguous and non-contiguous CCs. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the primary cell (PCell). The PCell is a cell, operating on the primary frequency, in which the UE either performs the initial connection establishment procedure or initiates the connection re-establishment procedure. Depending on UE capabilities, secondary cells (SCells) can be configured to form together with the PCell a set of serving cells. An SCell is a cell providing additional radio resources on top of special cell (SpCell). The configured set of serving cells for a UE therefore always consists of one PCell and one or more SCells. For dual connectivity (DC) operation, the term SpCell refers to the PCell of the master cell group (MCG) or the primary SCell (PSCell) of the secondary cell group (SCG). An SpCell supports PUCCH transmission and contention-based random access, and is always activated. The MCG is a group of serving cells associated with a master node, comprised of the SpCell (PCell) and optionally one or more SCells. The SCG is the subset of serving cells associated with a secondary node, comprised of the PSCell and zero or more SCells, for a UE configured with DC. For a UE in RRC_CONNECTED not configured with CA/DC, there is only one serving cell comprised of the PCell. For a UE in RRC_CONNECTED configured with CA/DC, the term "serving cells" is used to denote the set of cells comprised of the SpCell(s) and all SCells. In DC, two MAC entities are configured in a UE: one for the MCG and one for the SCG.

Figure 9:
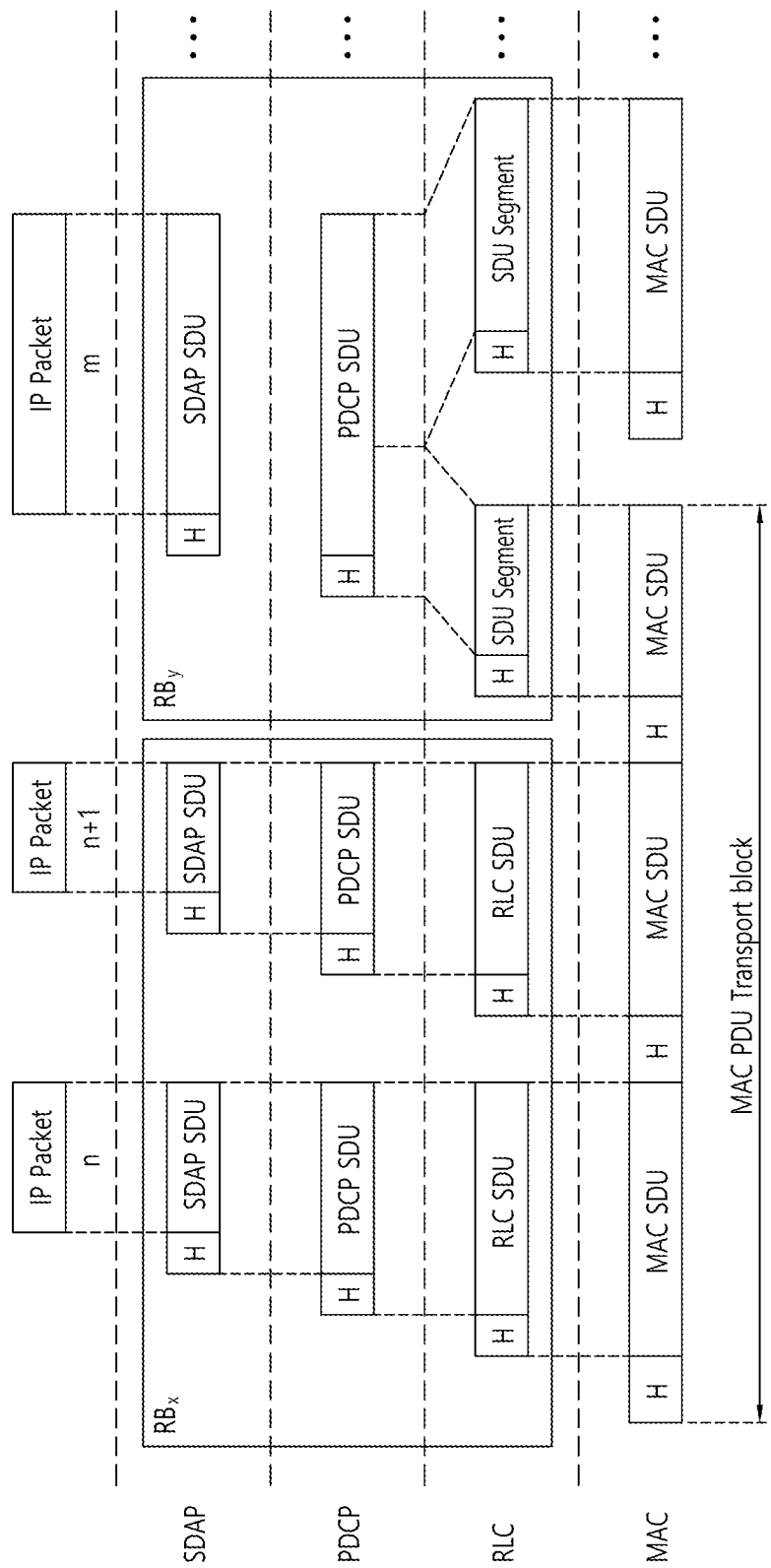
FIG. 9 shows a data flow example in the 3GPP NR system to which implementations of the present disclosure is applied.

FIG. 9 shows a data flow example in the 3GPP NR system to which implementations of the present disclosure is applied.

Referring to FIG. 9, "RB" denotes a radio bearer, and "H" denotes a header. Radio bearers are categorized into two groups: DRBs for user plane data and SRBs for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels PUSCH and PRACH, respectively, and the downlink transport channels DL-SCH, BCH and PCH are mapped to PDSCH, PBCH and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

Figure 10:
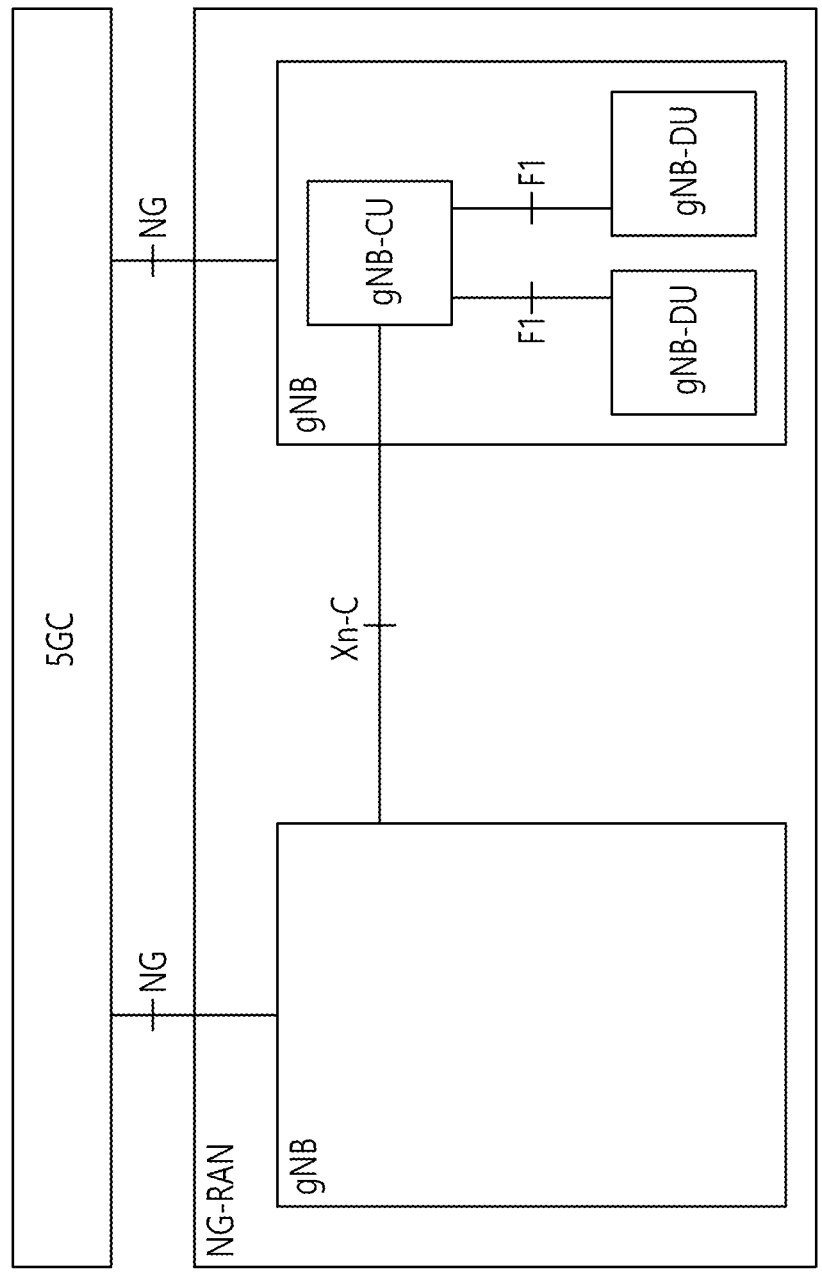
FIG. 10 shows an example of the overall architecture of an NG-RAN to which technical features of the present disclosure can be applied.

FIG. 10 shows an example of the overall architecture of an NG-RAN to which technical features of the present disclosure can be applied.

Referring to FIG. 10, a gNB may include a gNB-CU (hereinafter, gNB-CU may be simply referred to as CU) and at least one gNB-DU (hereinafter, gNB-DU may be simply referred to as DU).

The gNB-CU is a logical node hosting RRC, SDAP and PDCP protocols of the gNB or an RRC and PDCP protocols of the en-gNB. The gNB-CU controls the operation of the at least one gNB-DU.

The gNB-DU is a logical node hosting RLC, MAC, and physical layers of the gNB or the en-gNB. The operation of the gNB-DU is partly controlled by the gNB-CU. One gNB-DU supports one or multiple cells. One cell is supported by only one gNB-DU.

The gNB-CU and gNB-DU are connected via an F1 interface. The gNB-CU terminates the F1 interface connected to the gNB-DU. The gNB-DU terminates the F1 interface connected to the gNB-CU. One gNB-DU is connected to only one gNB-CU. However, the gNB-DU may be connected to multiple gNB-CUs by appropriate implementation. The F1 interface is a logical interface. For NG-RAN, the NG and Xn-C interfaces for a gNB consisting of a gNB-CU and gNB-DUs, terminate in the gNB-CU. For E-UTRAN-NR dual connectivity (EN-DC), the S1-U and X2-C interfaces for a gNB consisting of a gNB-CU and gNB-DUs, terminate in the gNB-CU. The gNB-CU and connected gNB-DUs are only visible to other gNBs and the 5GC as a gNB.

Functions of the F1 interface includes F1 control (F1-C) functions as follows.

(1) F1 Interface Management Function

The error indication function is used by the gNB-DU or gNB-CU to indicate to the gNB-CU or gNB-DU that an error has occurred.

The reset function is used to initialize the peer entity after node setup and after a failure event occurred. This procedure can be used by both the gNB-DU and the gNB-CU.

The F1 setup function allows to exchange application level data needed for the gNB-DU and gNB-CU to interoperate correctly on the F1 interface. The F1 setup is initiated by the gNB-DU.

The gNB-CU configuration update and gNB-DU configuration update functions allow to update application level configuration data needed between gNB-CU and gNB-DU to interoperate correctly over the F1 interface, and may activate or deactivate cells.

The F1 setup and gNB-DU configuration update functions allow to inform the single network slice selection assistance information (S-NSSAI) supported by the gNB-DU.

The F1 resource coordination function is used to transfer information about frequency resource sharing between gNB-CU and gNB-DU.

(2) System Information Management Function

Scheduling of system broadcast information is carried out in the gNB-DU. The gNB-DU is responsible for transmitting the system information according to the scheduling parameters available.

The gNB-DU is responsible for the encoding of NR master information block (MIB). In case broadcast of system information block type-1 (SIB1) and other SI messages is needed, the gNB-DU is responsible for the encoding of SIB1 and the gNB-CU is responsible for the encoding of other SI messages.

(3) F1 UE Context Management Function

The F1 UE context management function supports the establishment and modification of the necessary overall UE context.

The establishment of the F1 UE context is initiated by the gNB-CU and accepted or rejected by the gNB-DU based on admission control criteria (e.g., resource not available).

The modification of the F1 UE context can be initiated by either gNB-CU or gNB-DU. The receiving node can accept or reject the modification. The F1 UE context management function also supports the release of the context previously established in the gNB-DU. The release of the context is triggered by the gNB-CU either directly or following a request received from the gNB-DU. The gNB-CU request the gNB-DU to release the UE Context when the UE enters RRC_IDLE or RRC_INACTIVE.

This function can be also used to manage DRBs and SRBs, i.e., establishing, modifying and releasing DRB and SRB resources. The establishment and modification of DRB resources are triggered by the gNB-CU and accepted/rejected by the gNB-DU based on resource reservation information and QoS information to be provided to the gNB-DU. For each DRB to be setup or modified, the S-NSSAI may be provided by gNB-CU to the gNB-DU in the UE context setup procedure and the UE context modification procedure.

The mapping between QoS flows and radio bearers is performed by gNB-CU and the granularity of bearer related management over F1 is radio bearer level. For NG-RAN, the gNB-CU provides an aggregated DRB QoS profile and QoS flow profile to the gNB-DU, and the gNB-DU either accepts the request or rejects it with appropriate cause value. To support packet duplication for intra-gNB-DU carrier aggregation (CA), one data radio bearer should be configured with two GPRS tunneling protocol (GTP)-U tunnels between gNB-CU and a gNB-DU.

With this function, gNB-CU requests the gNB-DU to setup or change of the special cell (SpCell) for the UE, and the gNB-DU either accepts or rejects the request with appropriate cause value.

With this function, the gNB-CU requests the setup of the secondary cell(s) (SCell(s)) at the gNB-DU side, and the gNB-DU accepts all, some or none of the SCell(s) and replies to the gNB-CU. The gNB-CU requests the removal of the SCell(s) for the UE.

(4) RRC Message Transfer Function

This function allows to transfer RRC messages between gNB-CU and gNB-DU. RRC messages are transferred over F1-C. The gNB-CU is responsible for the encoding of the dedicated RRC message with assistance information provided by gNB-DU.

(5) Paging Function

The gNB-DU is responsible for transmitting the paging information according to the scheduling parameters provided.

The gNB-CU provides paging information to enable the gNB-DU to calculate the exact paging occasion (PO) and paging frame (PF). The gNB-CU determines the paging assignment (PA). The gNB-DU consolidates all the paging records for a particular PO, PF and PA, and encodes the final RRC message and broadcasts the paging message on the respective PO, PF in the PA.

(6) Warning Messages Information Transfer Function

This function allows to cooperate with the warning message transmission procedures over NG interface. The gNB-CU is responsible for encoding the warning related SI message and sending it together with other warning related information for the gNB-DU to broadcast over the radio interface.

Figure 11:
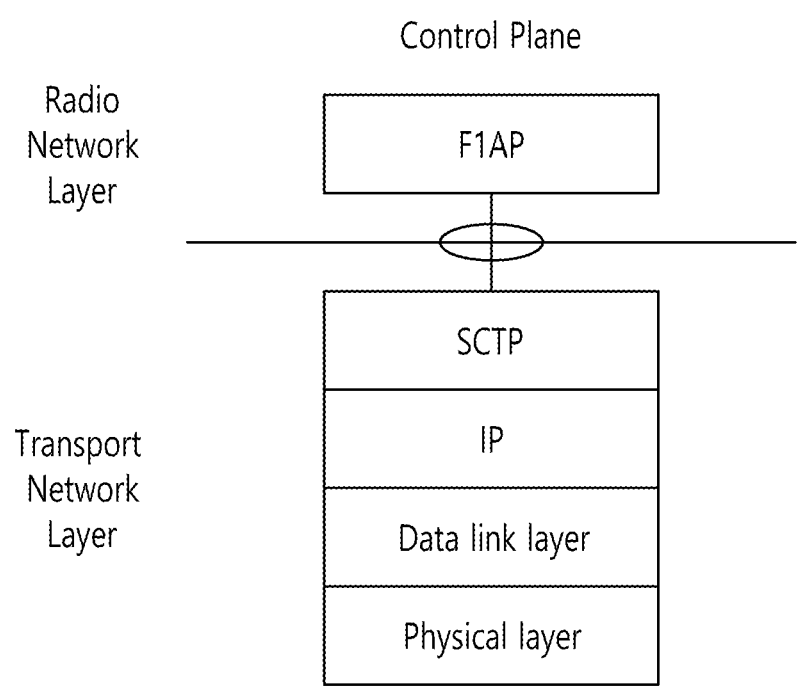
FIG. 11 shows an interface protocol structure for F1-C to which technical features of the present disclosure can be applied.

FIG. 11 shows an interface protocol structure for F1-C to which technical features of the present disclosure can be applied.

A transport network layer (TNL) is based on Internet protocol (IP) transport, comprising a stream control transmission protocol (SCTP) layer on top of the IP layer. An application layer signaling protocol is referred to as an F1 application protocol (E1AP).

Integrated access and backhaul (IAB) is described. Section 6 of 3GPP TR 38.874 V16.0.0 (2018-12) can be referred.

IAB-node is a node that provides functionality to support connectivity to the network for the UE via an NR backhaul. IAB-node is a RAN node that supports wireless access to UEs and wirelessly backhauls the access traffic. IAB-donor (or IAB-donor gNB) is a gNB that provides functionality to support an NR backhaul for IAB-nodes. IAB-donor is a RAN node which provides UE's interface to core network and wireless backhauling functionality to IAB-nodes. The IAB-donor and IAB-node(s) may have the relation of gNB-CU and gNB-DU. IAB-donor-CU is the gNB-CU of an IAB-donor gNB, terminating the F1 interface towards IAB-nodes and IAB-donor-DU. IAB-donor-DU is the gNB-DU of an IAB-donor gNB, hosting the IAB backhaul adaptation protocol (BAP) layer, providing wireless backhaul to IAB-nodes. NR backhaul link is NR link used for backhauling between an IAB-node to an IAB-donor, and between IAB-nodes in case of a multi-hop network. The NR backhaul link may be called other names, such as backhaul (BH) RLC channel.

IAB strives to reuse existing functions and interfaces defined for access. In particular, mobile-termination (MT), gNB-DU, gNB-CU, UPF, AMF and SMF as well as the corresponding interfaces NR Uu (between MT and gNB), F1, NG, X2 and N4 are used as baseline for the IAB architectures. Modifications or enhancements to these functions and interfaces for the support of IAB will be explained in the context of the architecture discussion. Additional functionality such as multi-hop forwarding is included in the architecture discussion as it is necessary for the understanding of IAB operation and since certain aspects may require standardization.

The MT function has been defined a component of the mobile equipment. MT is referred to as a function residing on an IAB-node that terminates the radio interface layers of the backhaul Uu interface toward the IAB-donor or other IAB-nodes.

Figure 12:
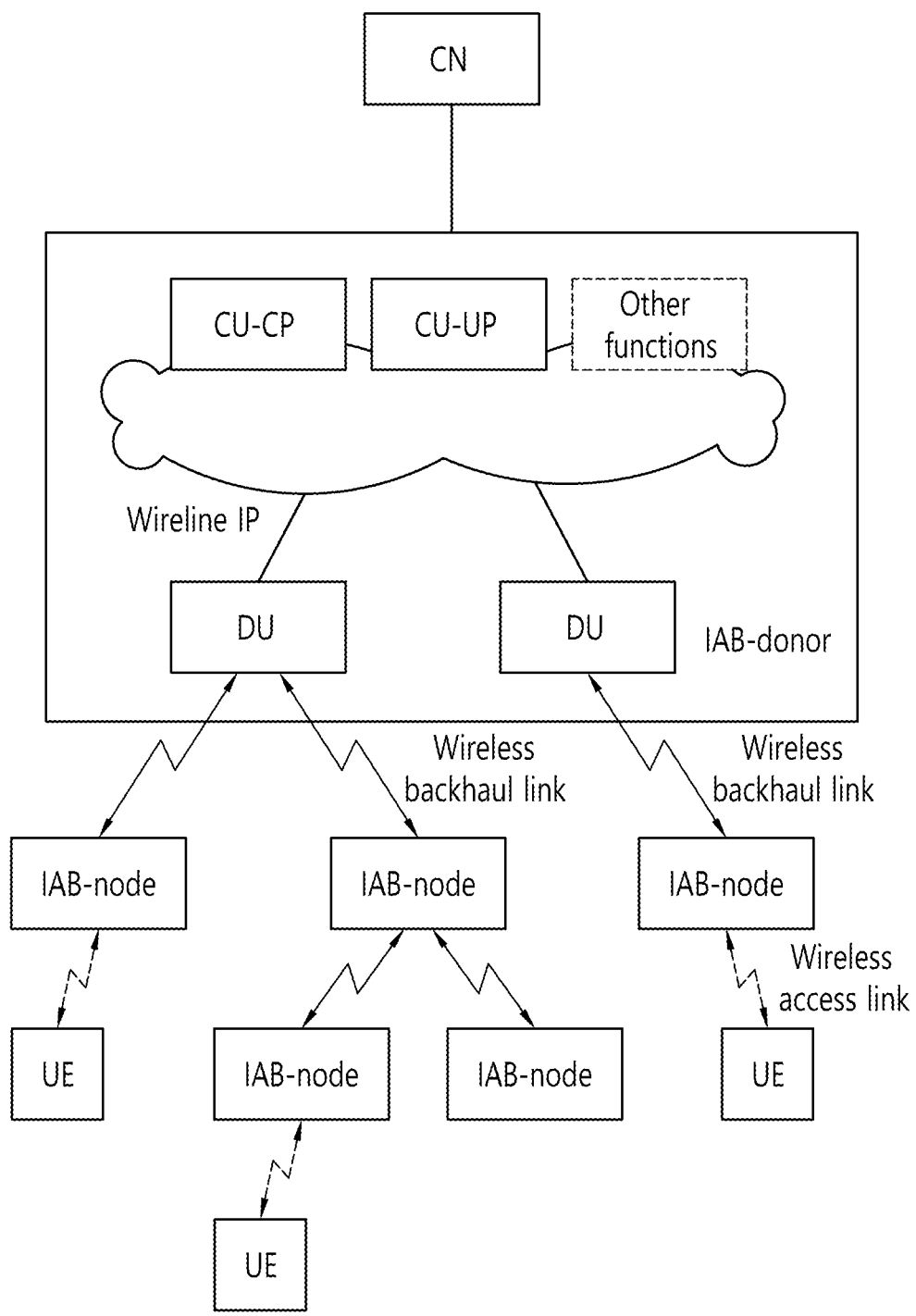
FIG. 12 shows a reference diagram for IAB in standalone mode, which contains one IAB-donor and multiple IAB-nodes, to which the technical features of the present disclosure can be applied.

FIG. 12 shows a reference diagram for IAB in standalone mode, which contains one IAB-donor and multiple IAB-nodes, to which the technical features of the present disclosure can be applied.

The IAB-donor is treated as a single logical node that comprises a set of functions such as gNB-DU, gNB-CU control plane (gNB-CU-CP), gNB-CU user plane (gNB-CU-UP) and potentially other functions. In a deployment, the IAB-donor can be split according to these functions, which can all be either collocated or non-collocated as allowed by 3GPP NG-RAN architecture. IAB-related aspects may arise when such split is exercised. Also, some of the functions presently associated with the IAB-donor may eventually be moved outside of the donor in case it becomes evident that they do not perform IAB-specific tasks.

Figure 13:
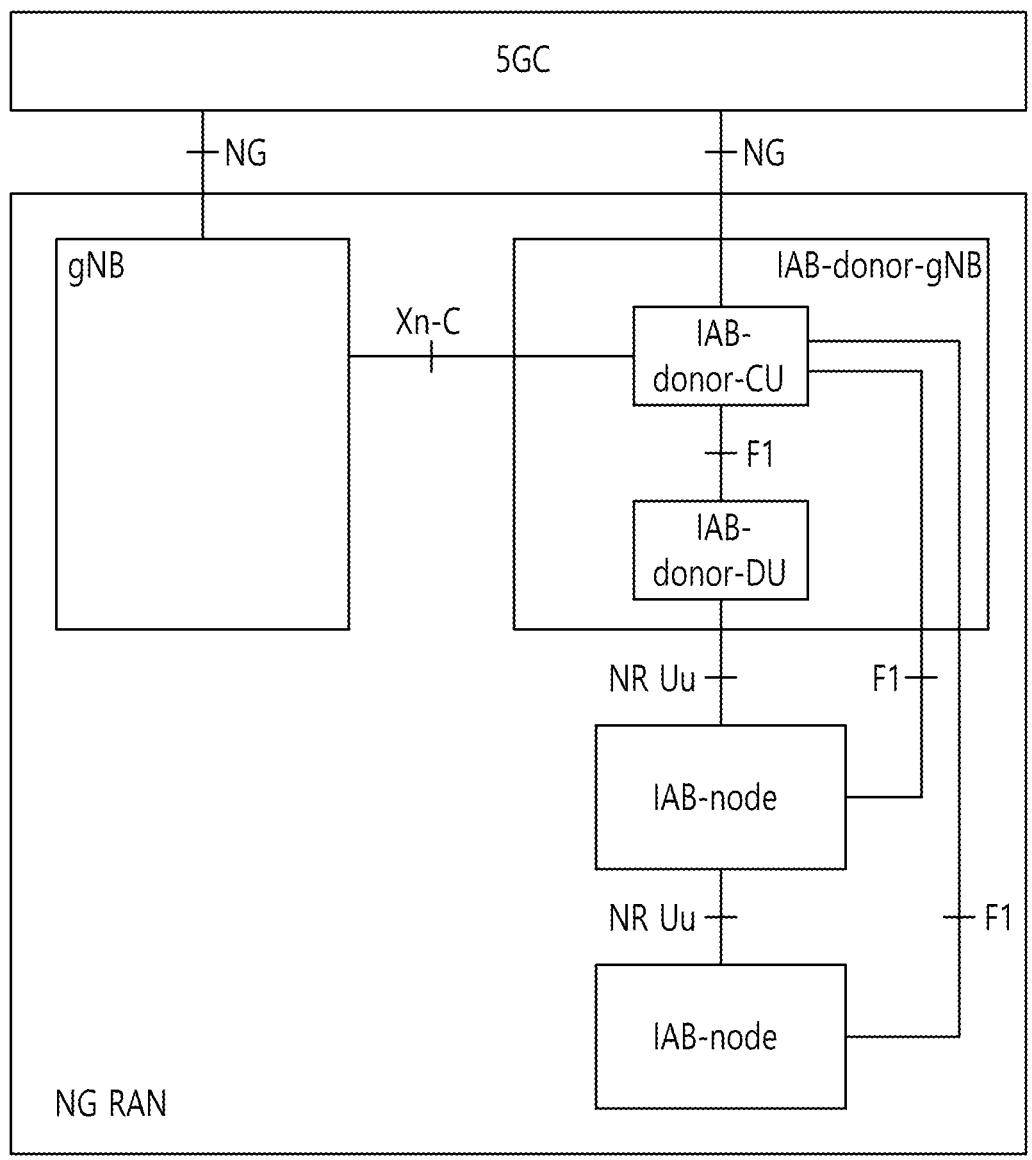
FIG. 13 shows an example of overall architecture of IAB to which the technical features of the present disclosure can be applied.

FIG. 13 shows an example of overall architecture of IAB to which the technical features of the present disclosure can be applied.

The NG-RAN supports IAB by the IAB-node wirelessly connecting to the gNB capable of serving the IAB-nodes, named IAB-donor gNB.

The IAB-donor gNB consists of an IAB-donor-CU and one or more IAB-donor-DU(s).

In case of separation of gNB-CU-CP and gNB-CU-UP, the IAB-donor gNB may consist of an IAB-donor-CU-CP, multiple IAB-donor-CU-UPs and multiple IAB-donor-DUs.

The IAB-node connects to an upstream IAB-node or an IAB-donor-DU via a subset of the UE functionalities of the NR Uu interface (named IAB-MT function of IAB-node). The IAB-node provides wireless backhaul to the downstream IAB-nodes and UEs via the network functionalities of the NR Uu interface (named IAB-DU function of IAB-node).

The F1-C traffic towards an IAB-node is backhauled via the IAB-donor-DU and the optional intermediate IAB-node(s).

The F1 user plane interface (F1-U) traffic towards an IAB-node is backhauled via the IAB-donor-DU and the optional intermediate IAB-node(s).

All functions specified for a gNB-DU are equally applicable for an IAB-node and IAB-donor-DU unless otherwise stated, and all functions specified for a gNB-CU are equally applicable for an IAB-donor-CU, unless otherwise stated. All functions specified for the UE context are equally applicable for managing the context of IAB-node MT functionality, unless otherwise stated.

Meanwhile, enhancement on IAB for NR was determined as one of work areas to be discussed. One among use cases which are possible to be discussed for this enhancement is energy efficient operation of IAB-node.

The IAB-nodes deployed in urban area may not provide the service during the certain time (for example, midnight) because there is no UE within their coverage areas or there is no data to be transmitted/received to/from their child IAB-node(s). During this time, they are unnecessary to be operated as IAB-node considering energy efficiency.

In addition, IAB-node may host two NR functions: (i) a Mobile Termination (MT), used to maintain the wireless backhaul connection towards an upstream IAB-node or IAB-donor, (ii) a Distributed Unit (DU), to provide access connection to the UEs or the downstream MTs of other IAB-nodes. The DU of the IAB-node may connect to a Central Unit (CU) hosted by the IAB-donor.

An IAB-donor and an IAB-node of IAB network may have the relation of a gNB Central Unit (gNB-CU) and a gNB Distributed Unit (gNB-DU) defined in 5G NR.

Therefore, the studies for energy efficient operation of a Distributed Unit (for example, an IAB-node or a gNB-DU) is needed.

Hereinafter, a method for saving energy for a Distributed Unit in a wireless communication system, according to some embodiments of the present disclosure, will be described with reference to following drawings.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

Figure 14:
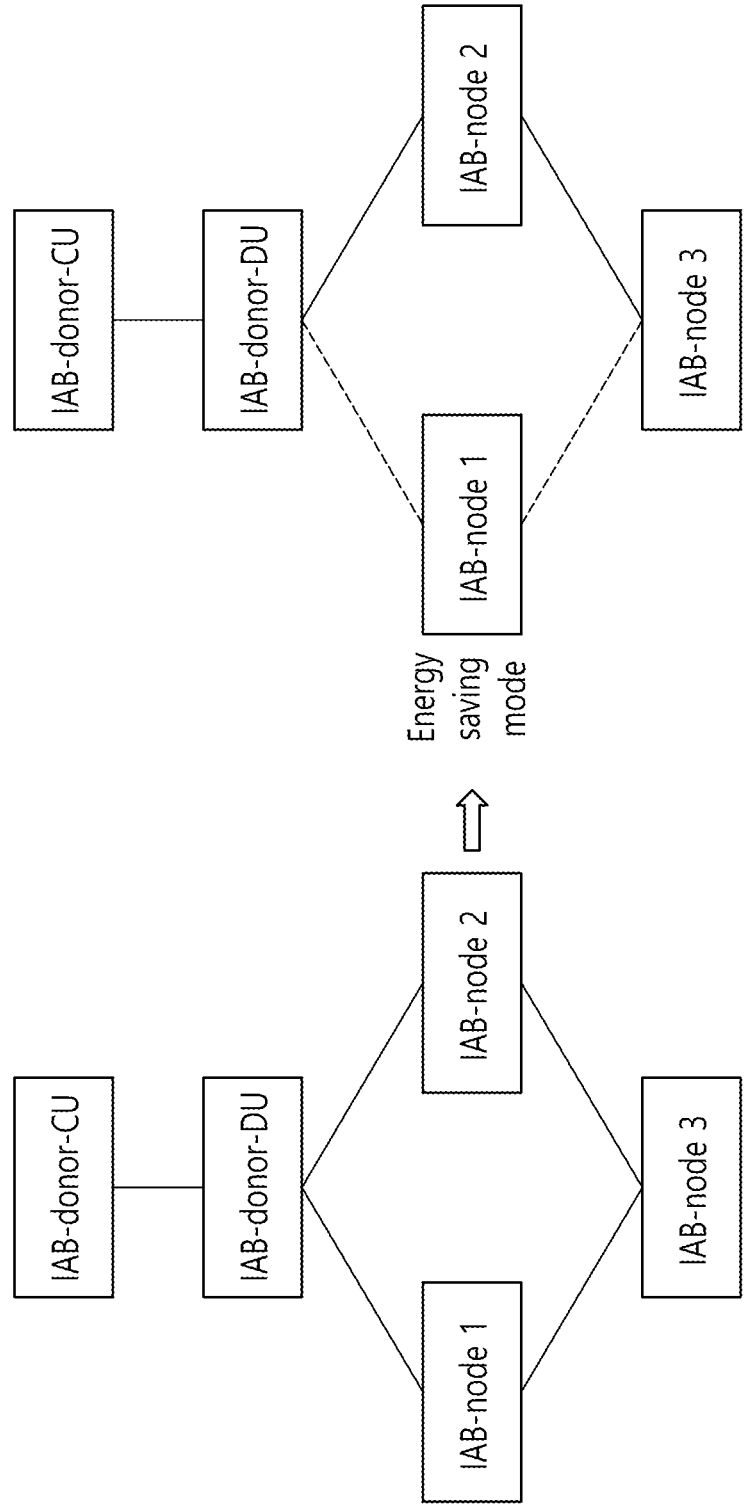
FIG. 14 shows an example of a scenario for energy saving mode of an IAB-node.

FIG. 14 shows an example of a scenario for energy saving mode of an IAB-node.

In FIG. 14, IAB-donor-CU may be connected to IAB-donor-DU. IAB-donor-DU may be connected to the both of IAB-node 1 and IAB-node 2. IAB-node 1 and IAB-node 2 may be connected to the IAB-node 3.

For example, in FIG. 14, IAB-node 1 could enter to energy saving mode because there is no UE within coverage of IAB-node 1 and there is no data to be transmitted/received to/from IAB-node 3.

Figure 15:
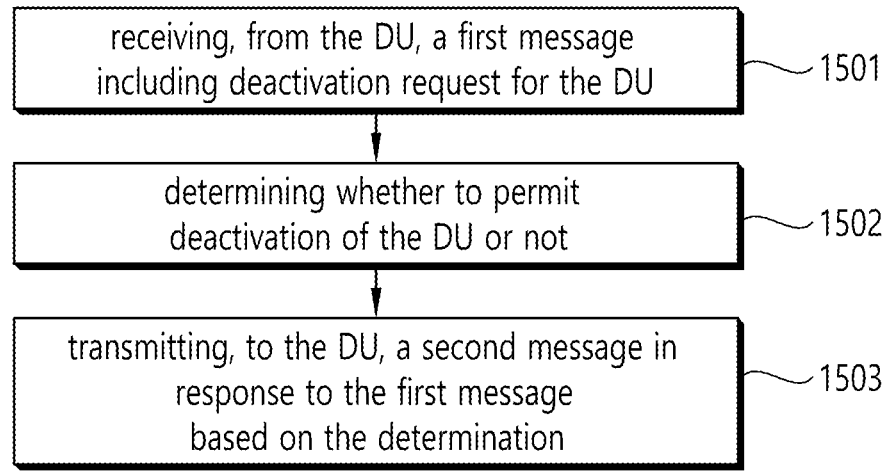
FIG. 15 shows an example of a method for saving energy for a Distributed Unit in a wireless communication system.

FIG. 15 shows an example of a method for saving energy for a Distributed Unit in a wireless communication system.

In particular, FIG. 15 shows an example of a method performed by a Central Unit (CU) in a wireless communication system.

The CU may establish a connection between a Distributed Unit (DU).

For example, the CU and the DU may be included in a next generation NodeB (gNB). In other words, the CU is a gNB-CU and the DU is a gNB-DU. In this case, the CU and the DU may be connected via an F1 interface.

For another example, the CU may be a CU of an integrated access and backhaul (IAB)-donor. The DU may be a DU of an IAB-node, wherein the IAB-node is connected to the IAB-donor. In this case, the CU and the DU may be connected via a wireless backhaul.

Referring to FIG. 15, in step 1501, the CU may receive, from the DU, a first message including deactivation request for the DU.

The DU may transmit, to the CU, the first message including the deactivation request based on situation of the connected UEs or the connected IAB-nodes. For example, the DU may transmit the deactivation request when there is no UE or IAB-node within coverage of the DU. For example, the DU may transmit the deactivation request when there is no data to be transmitted to and/or received from UEs or IAB-nodes connected to the DU.

The first message may include list of cells managed by the DU. For example, the list of cells may be included in the deactivation request. For other example, the deactivation request may be included in information on service status of a cell which the DU manages.

In step 1502, the CU may determine whether to permit deactivation of the DU or not.

For example, the CU may determine whether to permit the deactivation of the DU or not based on the list of the cells managed by the DU.

For example, the CU may determine whether to permit the deactivation of the DU or not based on user equipments (UEs) and/or IAB-nodes connected to the DU.

For example, the CU may determine whether to permit the deactivation of the DU or not based on user equipments (UEs) and/or IAB-nodes within the coverage of the CU.

The CU may maintain context related to the DU based on the determination that that the deactivation request for the DU is accepted. For example, the CU may use the context related to the DU for transmitting activation command later.

In step 1503, the CU may transmit, to the DU, a second message in response to the first message. The second message may include information informing that the deactivation request for the DU is accepted or not based on the determination.

For example, the second message may include a positive acknowledgement indicating that the deactivation request is accepted.

For another example, the second message may include a negative acknowledgement indicating that the deactivation request is not accepted.

According to some embodiments of the present disclosure, the CU may be connected to another DU. When the CU determines to permit the deactivation of the DU, the CU may transmit, to another DU, a third message informing that the DU enters to energy save mode.

For example, when the other DU receives the third message, the other DU may release connection with the DU which is in the energy saving mode.

In this example, the other DU may be in a connection with a wireless device. Then, the wireless device may be in communication with at least one of a user equipment, a network, or an autonomous vehicle other than the wireless device.

Figure 16:
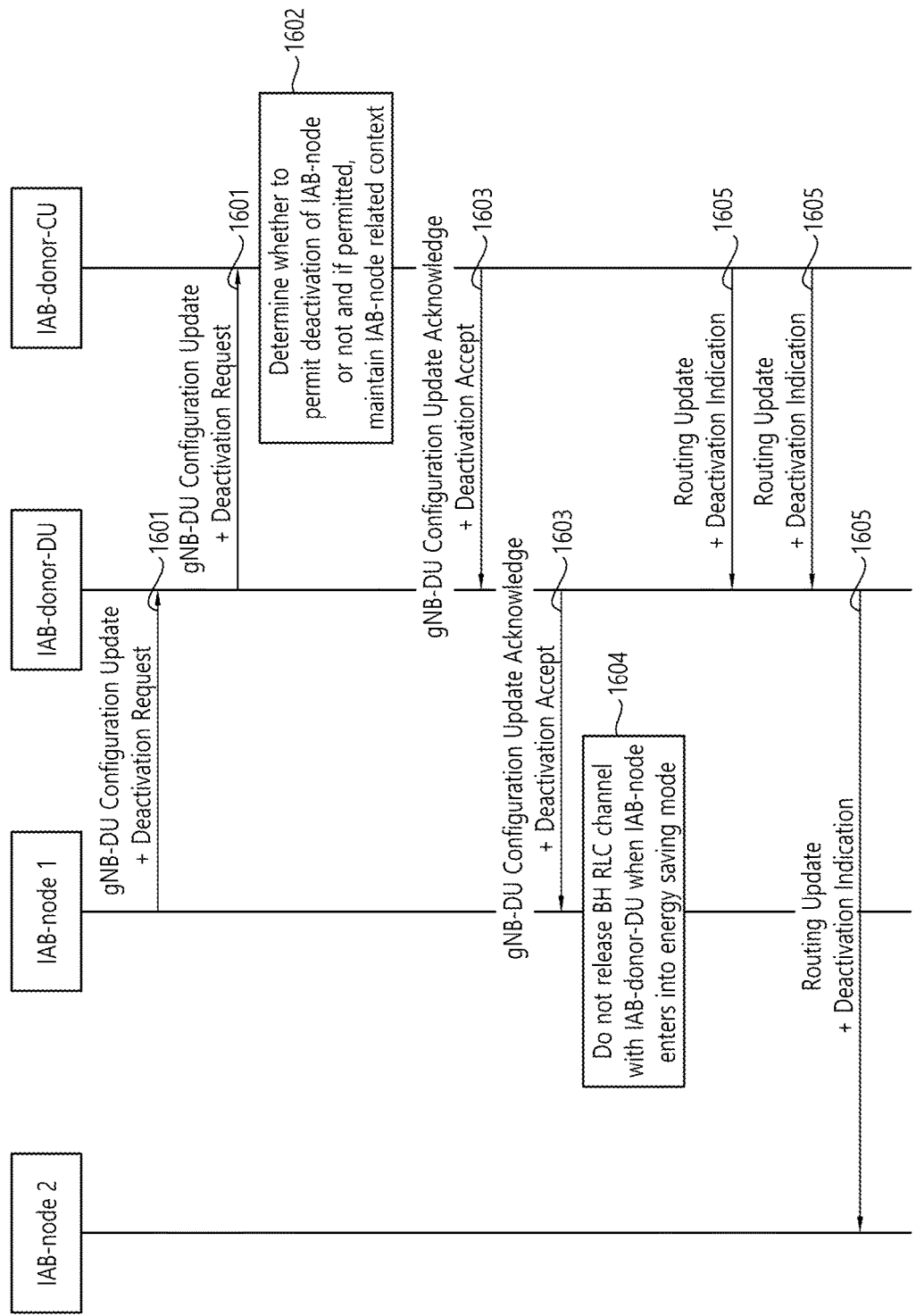
FIG. 16 shows a flow chart for an example of a method for saving energy for a Distributed Unit in a wireless communication system.

FIG. 16 shows a flow chart for an example of a method for saving energy for a Distributed Unit in a wireless communication system.

In particular, FIG. 16 shows a procedure for energy saving of an IAB-node in a wireless communication system. In FIG. 16, IAB network may include an IAB-donor-CU, an IAB-donor-DU, IAB-node 1, and IAB-node 2.

In FIG. 16, an IAB-node (for example, IAB-node 1) may request permission to the IAB-donor-CU so that the IAB-node enters into energy saving mode based on radio resource usage of the IAB-node (for example, when there is no UE within coverage of the IAB-node and/or there is no data to be transmitted/received to/from child IAB-node(s) of the IAB-node). Then, the IAB-donor-CU may respond acceptance or rejection for the request of the IAB-node considering the UEs and the IAB-nodes within coverage of the IAB-donor-CU.

Referring to FIG. 16, in step 1601, the IAB-node 1 may send, to the IAB-donor-CU via the IAB-donor-DU, a deactivation request.

For example, the IAB-node 1 may send, to the IAB-donor-CU via the IAB-donor-DU, a gNB-DU Configuration Update message, an existing message, or a new message including a deactivation request. The deactivation request may indicate that the IAB-node 1 wants to enter into energy saving mode.

For example, the IAB-node 1 may transmit, to the IAB-donor-CU, the deactivation request, in case there is no UE within coverage of the IAB-node 1 and/or there is no data to be transmitted to or received from child IAB-node(s) of the IAB-node 1.

The deactivation request may include the list of cell(s) which the IAB-node 1 manages. The deactivation request may be contained into the information which represents service status of a cell which the IAB-node 1 manages.

In step 1602, upon receiving the deactivation request from the IAB-node 1, the IAB-donor-CU may determine whether to permit the deactivation of the IAB-node 1 or not.

For example, the IAB-donor-CU may determine whether to permit the deactivation of the IAB-node 1 based on the IAB network situation. For example, the IAB-donor-CU may determine whether the IAB-node 1 is necessary or not. For example, the IAB-donor-CU may determine whether the IAB-node 1 is necessary by considering the UEs and IAB-nodes within the coverage of the IAB-donor-CU.

For example, when the IAB-donor-CU accepts the deactivation of the IAB-node 1, the IAB-donor-CU may maintain the context related to the IAB-node 1. The IAB-donor-CU may store the context related to the IAB-node 1 while the IAB-node 1 is deactivated. The IAB-donor-CU may use the context related to the IAB-node 1 to activate the IAB-node 1 subsequently In step 1603, the IAB-donor-CU may transmit, to the IAB-node 1, a deactivation accept.

For example, when the IAB-donor-CU accepts the deactivation request from the IAB-node 1, the IAB-donor-CU may transmit, to the IAB-node 1 via the IAB-donor-DU, the gNB-DU Configuration Update Acknowledge message, an existing message, or a new message including the deactivation accept. The deactivation accept may indicate that the deactivation request of the IAB-node 1 is permitted.

Otherwise, the IAB-donor-CU may transmit, to the IAB-node 1, a deactivation reject.

For example, when the IAB-donor-CU rejects the deactivation request from the IAB-node 1, the IAB-donor-CU may send, to the IAB-node 1 via the IAB-donor-DU, a gNB-DU Configuration Update Failure message, an existing message, or a new message including the deactivation reject with a cause value.

In step 1604, the IAB-node 1 may enter into energy saving mode.

For example, upon receiving the deactivation accept from the IAB-donor-CU, the IAB-node 1 may enter into energy saving mode.

For example, when the IAB-node 1 is in the energy saving mode, the IAB-node 1 may not release backhaul RLC channel with the IAB-donor-DU. Thus the IAB-node 1 may be able to receive, from the IAB-donor-CU, a message related to activation.

For example, the IAB-node 1 may release backhaul RLC channel with the IAB-node 2.

In step 1605, the IAB-donor-CU may send, to the IAB-donor-DU and the IAB-node 2, a deactivation indication related to the IAB-node 1.

For example, the IAB-donor-CU may send, to the IAB-donor-DU and the IAB-node 2, a Routing Update message, an existing message, or a new message including the deactivation indication to indicate that the IAB-node 1 enters into energy saving mode.

The deactivation indication may include an identifier (ID) of the IAB-node 1 (for example, IP address and/or ID) and/or the list of cell(s) which the IAB-node 1 manages.

In addition, the deactivation indication may be included in the information which represents service status of a cell which the IAB-node 1 manages.

The IAB-donor-DU may maintain the context related to the IAB-node 1 while the IAB-node 1 is in the energy saving mode.

For example, when the IAB-donor-DU receives the deactivation indication, the IAB-donor-DU may maintain the context related to IAB-node 1. The IAB-donor-DU may use the context related to IAB-node 1 to activate the IAB-node 1 subsequently.

For example, the IAB-donor-DU may not release backhaul RLC channel with IAB-node 1. Thus the IAB-donor-DU could forward the message related to activation from the IAB-donor-CU to the IAB-node 1.

The IAB-node 2 may release backhaul RLC channel with the IAB-node 1. For example, when the IAB-node 2 receives the deactivation indication related to the IAB-node 1, the IAB-node 2 may release backhaul RLC channel with the IAB-node 1.

Figure 17:
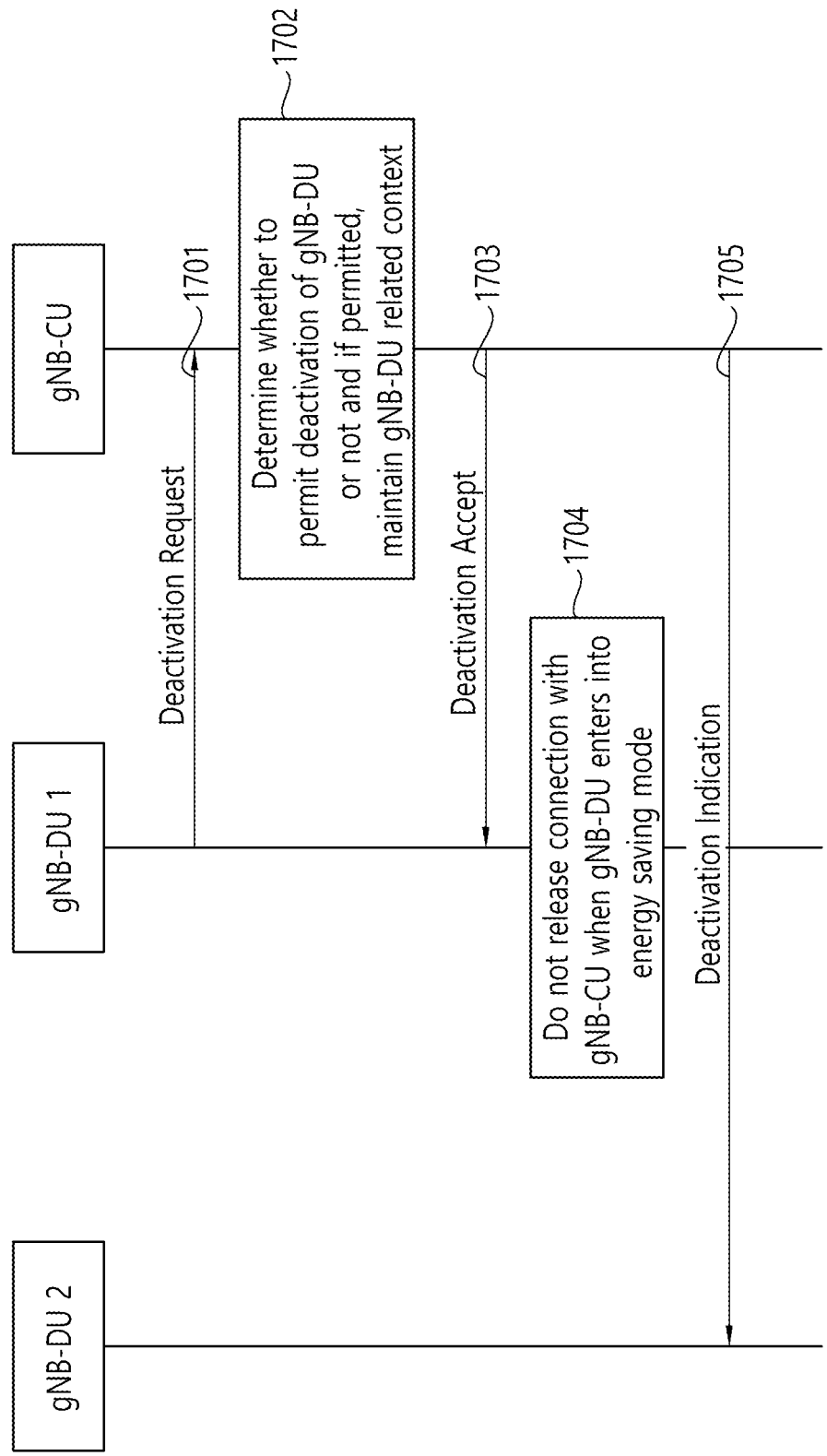
FIG. 17 shows a flow chart for an example of a method for saving energy for a Distributed Unit in a wireless communication system.

FIG. 17 shows a flow chart for an example of a method for saving energy for a Distributed Unit in a wireless communication system.

In particular, FIG. 17 shows a procedure for energy saving of a gNB-DU in a wireless communication system. In FIG. 17, a gNB may include a gNB-CU, gNB-DU 1, and gNB-DU 2.

In step 1701, gNB-DU 1 may send, to the gNB-CU, a deactivation request. For example, gNB-DU 1 may send, to the gNB-CU, an existing message or a new message including the deactivation request. The deactivation request may indicate that the gNB-DU 1 wants to enter into energy saving mode.

For example, the gNB-DU 1 may transmit, to the gNB-CU, the deactivation request, in case there is no wireless device (for example, UE or IAB-node) within coverage of the gNB-DU 1.

The deactivation request may include the list of cell(s) which the gNB-DU 1 manages. The deactivation request may be included in the information which represents service status of a cell which the gNB-DU 1 manages.

In step 1702, upon receiving the deactivation request from the gNB-DU 1, the gNB-CU may determine whether to permit the deactivation of the gNB-DU 1 or not.

For example, the gNB-CU may determine whether to permit the deactivation of the gNB-DU 1 based on the network situation. For example, the gNB-CU may determine whether the gNB-DU 1 is necessary or not. For example, the gNB-CU may determine whether the gNB-DU 1 is necessary by considering the wireless devices (for example, UEs and/or IAB-nodes) within the coverage of the gNB-CU.

For example, when the gNB-CU accepts the deactivation of the gNB-DU 1, the gNB-CU may maintain the context related to the gNB-DU 1. The gNB-CU may store the context related to the gNB-DU 1 while the gNB-DU 1 is deactivated. The gNB-CU may use the maintained context related to the gNB-DU 1 to activate the gNB-DU 1 subsequently.

In step 1703, the gNB-CU may transmit, to the gNB-DU 1, a deactivation accept.

For example, when the gNB-CU accepts the deactivation request from the gNB-DU 1, the gNB-CU may transmit, to the gNB-DU 1, an existing message or a new message including the deactivation accept. The deactivation accept may indicate that the deactivation request from the gNB-DU 1 is permitted.

Otherwise, the gNB-CU may transmit, to the gNB-DU 1, a deactivation reject.

For example, when the gNB-CU rejects the deactivation request from the gNB-DU 1, the gNB-CU may send, to the gNB-DU 1, an existing message or a new message including the deactivation reject with a cause value.

In step 1704, the gNB-DU 1 may enter into energy saving mode.

For example, upon receiving the deactivation accept from the gNB-CU, the gNB-DU 1 may enter into energy saving mode.

For example, when the gNB-DU 1 is in the energy saving mode, the gNB-DU 1 may be able to receive, from the gNB-CU, a message related to activation.

In step 1705, the gNB-CU may send, to the gNB-DU 2, a deactivation indication related to the gNB-DU 1.

For example, the gNB-CU may send, to the gNB-DU 2, an existing message or a new message including the deactivation indication to indicate that the gNB-DU 1 enters into energy saving mode.

The deactivation indication may include an identifier (ID) of the gNB-DU 1 (for example, IP address and/or ID) and/or the list of cell(s) which the gNB-DU 1 manages.

In addition, the deactivation indication may be included in the information which represents service status of a cell which the gNB-DU 1 manages.

The present disclosure may have various advantageous effects.

According to some embodiments of the present disclosure described with reference to FIGS. 14 to 17, a Distributed Unit in a wireless communication system could perform energy efficient operation.

For example, a gNB-DU could enter into energy saving mode depending of permission of a gNB-CU.

For example, adjacent gNB-DU(s) connected to the gNB-CU could know that the gNB-DU enters to the energy saving mode.

Thus, the power of the gNB could be used efficiently. In addition, the degradation of UE's experience by energy saving of a gNB-DU could be avoided.

For example, an IAB-node could enter into energy saving mode depending on permission of IAB-donor based on IAB network situation.

For example, adjacent IAB-node(s) having backhaul RLC channel with the IAB-node could know that the IAB-node enters to the energy saving mode.

Thus, the power of IAB network could be used efficiently. In addition, the degradation of UE's experience by energy saving of the IAB-node could be avoided.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by an Integrated Access and Backhaul (IAB)-donor-Distributed Unit (DU) in a wireless communication system, the method comprising,
receiving, from a first IAB-node, a first message including a deactivation request, wherein the deactivation request informs the LAB-donor-DU that (i) there is no wireless device within a coverage of the first IAB-node or (ii) there is no data to be transmitted to or to be received from a child IAB-node related to the first IAB-node;
transmitting, to an IAB-donor-Central Unit (CU), the deactivation request, wherein the deactivation request is accepted by the IAB-donor-CU;
receiving, from the IAB-donor-CU, a second message including information informing the LAB-donor-DU that the deactivation request for the first IAB-node is accepted by the IAB-donor-CU;
transmitting, to the first IAB-node, the information that the deactivation request is accepted by the IAB-donor-CU, wherein the first IAB-node enters into an energy saving mode without releasing a backhaul Radio Link Control (RLC) channel with the IAB-donor-DU;
receiving, from the IAB-donor-CU, a third message including information informing the IAB-donor DU that the first IAB-node enters into the energy saving mode; and
transmitting, to a second IAB-node, the information that the first IAB-node enters into the energy saving mode.

2. The method of claim 1, wherein the first message includes list of cells managed by the first IAB-node.

3. The method of claim 2, wherein the deactivation request is accepted by the IAB-donor-CU based on the list of the cells managed by the first IAB-node.

4. The method of claim 1, wherein the deactivation request is accepted by the IAB-donor-CU based on and one or more wireless devices one or more child IAB-nodes connected to the first IAB-node.

5. The method of claim 1, wherein the method further comprises:
maintaining context related to the first IAB-node based on that the first IAB-node enters into the energy saving mode.

6. The method of claim 1, wherein the LAB-donor-CU and the LAB-donor-DU are connected via a wireless backhaul.

7. A non-transitory computer-readable medium having stored thereon a plurality of instructions, which, when executed by a processor of an Integrated Access and Backhaul (IAB)-donor-Distributed Unit(DU), cause the IAB-donor-DU to:
receiving, from a first IAB-node, a first message including a deactivation request, wherein the deactivation request informs the IAB-donor-DU that (i) there is no wireless device within a coverage of the first IAB-node or (ii) there is no data to be transmitted to or to be received from a child IAB-node related to the first IAB-node;
transmitting, to an IAB-donor-Central Unit (CU), the deactivation request, wherein the deactivation request is accepted by the IAB-donor-CU;
receiving, from the IAB-donor-CU, a second message including information informing the IAB-donor-DU that the deactivation request for the first IAB-node is accepted by the IAB-donor-CU;
transmitting, to the first IAB-node, the information that the deactivation request is accepted by the LAB-donor-CU, wherein the first IAB-node enters into an energy saving mode without releasing a backhaul Radio Link Control (RLC) channel with the IAB-donor-DU;
receiving, from the IAB-donor-CU, a third message including information informing the IAB-donor-DU that the first IAB-node enters into the energy saving mode; and
transmitting, to a second IAB-node, the information that the first IAB-node enters into the energy saving mode.

8. An Integrated Access and Backhaul (IAB)-donor-Distributed Unit (DU) in a wireless communication system comprising:
a memory; and
at least one processor operatively coupled to the memory, and configured to:
receive, from a first IAB-node, a first message including a deactivation request, wherein the deactivation request informs the IAB-donor-DU that (i) there is no wireless device within a coverage of the first IAB-node or (ii) there is no data to be transmitted to or to be received from a child IAB-node related to the first IAB-node;
transmit, to an IAB-donor-Central Unit (CU), the deactivation request, wherein the deactivation request is accepted by the IAB-donor-CU;
receive, from the IAB-donor-CU, a second message including information informing the IAB-donor-DU that the deactivation request for the first IAB-node is accepted by the IAB-donor-CU;
transmit, to the first IAB-node, the information that the deactivation request is accepted by the IAB-donor-CU, wherein the first IAB-node enters into an energy saving mode without releasing backhaul Radio Link Control (RLC) channel with the IAB-donor-DU;
receive, from the IAB-donor-CU, a third message including information informing the IAB-donor-DU that the first IAB-node enters into the energy saving mode; and
transmit, to a second IAB-node, the information that the first IAB-node enters into the energy saving mode.

* * * * *